United States Patent
Klonowski et al.

(10) Patent No.: US 11,827,374 B2
(45) Date of Patent: Nov. 28, 2023

(54) MULTI-ROTOR AIRCRAFT PROPULSION SYSTEM WITH RECONFIGURABLE ELECTRIC NETWORK

(71) Applicants: SAFRAN, Paris (FR); SAFRAN ELECTRICAL & POWER, Blagnac (FR); SAFRAN HELICOPTER ENGINES, Bordes (FR); SAFRAN POWER UNITS, Toulouse (FR); SAFRAN ELECTRONICS & DEFENSE, Boulogne Billancourt (FR)

(72) Inventors: Thomas Klonowski, Moissy-Cramayel (FR); Thomas Barraco, Moissy-Cramayel (FR); Camel Serghine, Moissy-Cramayel (FR)

(73) Assignees: SAFRAN, Paris (FR); SAFRAN ELECTRICAL & POWER, Blagnac (FR); SAFRAN HELICOPTER ENGINES, Bordes (FR); SAFRAN POWER UNITS, Toulouse (FR); SAFRAN ELECTRONICS & DEFENSE, Boulogne Billancourt (FR)

( * ) Notice: Subject to any disclaimer, the term of this patent is extended or adjusted under 35 U.S.C. 154(b) by 563 days.

(21) Appl. No.: 17/041,093

(22) PCT Filed: Mar. 25, 2019

(86) PCT No.: PCT/FR2019/050673
§ 371 (c)(1),
(2) Date: Sep. 24, 2020

(87) PCT Pub. No.: WO2019/186042
PCT Pub. Date: Oct. 3, 2019

(65) Prior Publication Data
US 2021/0139154 A1     May 13, 2021

(30) Foreign Application Priority Data
Mar. 26, 2018 (FR) .................................. 1852607

(51) Int. Cl.
*B64D 35/02*    (2006.01)
*B64D 27/24*    (2006.01)
(Continued)

(52) U.S. Cl.
CPC .............. *B64D 35/02* (2013.01); *B64C 27/08* (2013.01); *B64D 27/24* (2013.01); *H02J 7/0063* (2013.01);
(Continued)

(58) Field of Classification Search
CPC ...................... B64D 2221/00; B64D 2027/026
See application file for complete search history.

(56) References Cited

U.S. PATENT DOCUMENTS

| 9,143,029 | B2 | 9/2015 | Sihler et al. |
| 2011/0184579 | A1 | 7/2011 | Nilsen et al. |

(Continued)

FOREIGN PATENT DOCUMENTS

| CN | 105711826 A | 6/2016 |
| EP | 3296212 A1 | 3/2018 |
| EP | 3318492 A1 | 5/2018 |

OTHER PUBLICATIONS

Search Report issued in French Patent Application No. 1852607 dated Nov. 22, 2018.
(Continued)

*Primary Examiner* — Nicholas McFall
(74) *Attorney, Agent, or Firm* — Pearne & Gordon LLP

(57) ABSTRACT

In the field of multi-rotor rotary-wing aircraft a propulsion system for such an aircraft includes a reconfigurable electric network for supplying the electric motors driving the rotors.
(Continued)

The system includes: a supply source, a supply bus connected to the supply source, at least four drive units each including an electric motor and its control circuit, and an electrical ring network including: an electrical line which is interrupted at each drive unit and whose ends are connected to the supply bus, and, for each drive unit, a first switch and a second switch that are connected between the control circuit and the electrical line, on either side of the interruption.

9 Claims, 4 Drawing Sheets

(51) Int. Cl.
*B64C 27/08* (2023.01)
*H02J 7/00* (2006.01)
*B64U 30/20* (2023.01)
*B64D 27/02* (2006.01)

(52) U.S. Cl.
CPC .... *B64D 2027/026* (2013.01); *B64D 2221/00* (2013.01); *B64U 30/20* (2023.01)

(56) References Cited

U.S. PATENT DOCUMENTS

2013/0154349 A1 6/2013 Sihler et al.
2016/0340051 A1 11/2016 Edwards et al.

OTHER PUBLICATIONS

International Search Report issued in Application No. PCT/FR2019/050673 dated Jul. 15, 2019.
Written Opinion issued in Application No. PCT/FR2019/050673 dated Jul. 15, 2019.

MULTI-ROTOR AIRCRAFT PROPULSION SYSTEM WITH RECONFIGURABLE ELECTRIC NETWORK

This is the National Stage of PCT international application PCT/FR2019/050673, filed on Mar. 25, 2019 entitled "MULTI-ROTOR AIRCRAFT PROPULSION SYSTEM WITH RECONFIGURABLE ELECTRIC NETWORK", which claims the priority of French Patent Application No. 1852607 filed Mar. 26, 2018, both of which are incorporated herein by reference in their entirety.

TECHNICAL FIELD

The invention relates to the field of multi-rotor rotary wing aircraft. It relates to a propulsion system for such an aircraft comprising a reconfigurable electrical network to power the electric rotor drive motors. The propulsion system can equally be used to power a pilotless aircraft or an aircraft with a crew.

STATE OF PRIOR ART

Multi-rotor rotary wing aircraft generally comprise at least four electric motors powered in parallel from a common electrical power supply source. For aircraft with relatively limited power, this power supply source is typically an electrical battery. It may consist of a thermoelectric power generation set for more powerful aircraft. This set then comprises a thermal combustion engine and an electricity generator to transform the mechanical energy output by the thermal combustion engine into electrical energy. Power converters are often associated with the set to adapt the electrical energy supplied to the needs of the electric motors. A propulsion system comprising such a thermoelectric power generation set is commonly called a "series hybrid architecture".

In order to enable control of multi-rotor rotary wing aircraft, the electric motors must be controllable and powered individually or at least in groups. The result is an increased number of control and power supply circuits, particularly for power converters, and power supply cables. The size, weight, complexity and reliability of the propulsion system then become a handicap. Patent application number FR 16 59366 discloses mutualisation of part of the electrical energy conversion function for different electric motors in a propulsion system for a multi-rotor aircraft. Each power inverter then powers two electric motors, halving the required number of inverters.

In most propulsion systems for aircraft, the electric motors are connected in parallel to the electrical power supply source. In the case of an electrical fault in an electric motor, an inverter or between an inverter and the electricity power supply source, the entire propulsion system becomes inoperative if no protection device is provided. With a parallel power supply, it can be chosen to maximise mutualisation of the wiring of the different electric motors. Electrical protection devices are then arranged close to the electric motors. An electrical fault affecting the common power supply line then causes the loss of the entire propulsion system. But on the contrary, by choosing to maximise individualisation of the wiring of electric motors, the electrical protection devices can be located close to the power supply source. It is then possible to isolate a defective power supply line while keeping the other lines, and therefore maintaining the power supply to the other electric motors. However the increased number of power supply lines has the disadvantage of increased size and complexity.

Considering the above, the purpose of the invention is to provide a solution to prevent loss of operation of the entire propulsion system in the case of an electrical fault, while preventing an increased number of power supply lines. Another purpose of the invention is to supply a propulsion system for a multi-rotor aircraft for which the design, manufacturing and maintenance costs are reduced.

SUMMARY OF THE INVENTION

To achieve this, the invention is based on a reconfigurable annular electrical network, in which each electric motor can be powered through the two ends of the ring, or through only one end in the case of an electrical fault between the electric motor and the other end of the ring.

More precisely, the subject of the invention is a propulsion system for a multi-rotor rotary wing aircraft, comprising:
- an electrical power source capable of outputting a power supply current,
- an electrical power supply bus connected to the electrical power supply source,
- at least four motor units, each motor unit comprising a control circuit, an electric motor connected to the control circuit and a propeller mechanically connected to a rotor of the electric motor, the control circuit being capable of supplying power to the electric motor from the power supply current output by the electrical power supply source, and
- an annular electrical network capable of connecting each motor unit control circuit to the electrical power supply bus, the annular electrical network comprising:
    - an electrical line, of which a first end and a second end are connected to the electrical power supply bus, the electrical line being interrupted at each motor unit and comprising a first connection point at its first end and a second connection point at its second end, and
    - for each motor unit, a first switch and a second switch, the first switch connecting the motor unit control circuit to the first connection point of the electrical line, the second switch connecting said control circuit to the second connection point of the electrical line.

Thus, in the case of an electrical fault in one of the motor units, the motor unit concerned can be electrically isolated by opening the two associated switches. All other motor units remain powered through the first or the second end of the electrical line. Furthermore, in the case of an electrical fault on the electrical line between a first connection point associated with a first motor unit and a second connection point associated with a second motor unit, the first switch connected to the first connection point and the second switch associated with the second connection point are open, the other switches then being left closed. The electrical line segment in fault is then isolated while maintaining the power supply to all the other motor units.

According to one particular embodiment, the annular electrical network also comprises a third switch for each motor unit, connecting the first connection point to the second connection point of the electrical line. In other words, the third switches form bypass paths around the engine units. In this embodiment, the annular electricity network can handle electrical faults present simultaneously in more than one engine unit. The first and second switches associated with the engine units in fault are open to electrically isolate these units, and the third switches of these engine units are closed to maintain continuity of the electrical line and to supply power to all engine units that are not in fault.

The switches of the annular electrical network are preferably controlled switches, to enable automatic management of the network configuration.

The propulsion system may include a control unit of the annular electrical network. The control unit may for example be arranged to control opening and closing of the switches of the annular electrical network as a function of the detection of electrical faults at motor units and/or the electrical line. The electrical faults can be detected by monitoring currents and/or voltages at the different electric motors. The currents and/or voltages used may for example correspond to signals measured for regulation of the electric motors.

According to a first embodiment, the electrical power supply source comprises one or several electricity generating sets. The electrical power may for example be generated from a fossil fuel. In particular, each electricity generating set may comprise an internal combustion engine and an electricity generator. The electricity generator is mechanically coupled to a rotor of the internal combustion engine and is connected to the electrical power supply bus. The internal combustion engine may for example be a gas turbine.

According to a second embodiment, the electrical power supply source comprises an electrical energy storage unit connected to the electrical power supply bus. The electrical energy storage unit may in particular comprise a battery or supercapacitors.

The first and second embodiments are fully compatible with each other. For example, the electricity generating sets can supply medium power while the electrical energy storage unit provides additional power in some energy-greedy phases and recharges during flight phases requiring lower power. Furthermore, the electrical energy storage unit can be used alone to supply the power necessary to the motor units, particularly when the aircraft needs to limit its noise footprint.

Advantageously, the electrical power supply source comprises a switch and/or a circuit breaker between each electricity generator and the electrical power supply bus and/or between the electrical energy storage unit and the electrical power supply bus. In the presence of switches, the power supply source element(s) participating in the supply of electrical power can be selected. The circuit breakers electrically isolate elements in fault to maintain a supply of electrical power.

According to one particular embodiment, the electrical power supply source is arranged to output a dc current on the electrical power supply bus. This then facilitates power management of the electric motors.

Each electricity generating set may comprise a rectifier connected between the electricity generator and the electrical power supply bus. For example it may be a pulse width modulation rectifier with sinusoidal absorption. Such a rectifier enables better control over the current injected on the electrical power supply bus and therefore enables operation of the electric motors with minimum core losses and minimum harmonic rejection, on both the input and output sides of the rectifier. Due to the presence of a signal with a low harmonic distortion ratio at the rectifier output, several electricity generators can be coupled in parallel without a risk of the formation of recirculation currents within the transformers of the rectifier.

The electrical power supply source may include a chopper connected between the electrical energy storage unit and the electrical power supply bus. The chopper adapts the voltage output by the electrical energy storage unit to the voltage required on the electrical power supply bus. It also makes it possible to manage charging of the electrical energy storage unit.

According to another embodiment, the electrical power supply source is arranged to output an alternating current on the electrical power supply bus. It can be a single-phase or multi-phase, for example three-phase, alternating current.

Each electricity generating set may comprise an ac-ac converter connected between the electricity generator and the electrical power supply bus.

Furthermore, the power supply source may include an inverter connected between the electrical energy storage unit and the electrical power supply bus.

The control circuit of each motor unit may comprise a converter. The converter adapts the voltage output by the electrical power supply bus to the voltage necessary for the electric motor.

In one particular embodiment, the control circuit of each motor unit is integrated into the motor. The motor is then commonly called a "smart motor". Such an integration of the control circuit makes the motor unit more compact and makes it possible to mutualise the cooling system of the motor and its associated electronics.

According to a first variant embodiment, each motor unit comprises a pair of counter-rotating propellers, each propeller being mechanically coupled to a rotor of the electric motor. A first propeller is coupled to the rotor so as to rotate in the same direction as the rotor and a second propeller is coupled to the rotor so as to rotate in the inverse direction.

According to a second variant embodiment, the electric motor of each motor unit comprises a single stator and two counter-rotating rotors. Each motor unit then comprises a pair of propellers, one of which is mechanically coupled to a first rotor and the second to a second rotor.

In this second variant embodiment, the two rotors are advantageously controlled by the same converter.

Another subject of the invention is a rotary wing aircraft comprising a propulsion system as described above.

BRIEF DESCRIPTION OF THE DRAWINGS

Other characteristics, details and advantages of the invention will become clear after reading the description given below, given solely as an example, with reference to the appended drawings in which.

DETAILED DESCRIPTION OF PARTICULAR EMBODIMENTS

As a preliminary remark, note that for reasons of conciseness, the different elements designated below by a reference terminating with a letter can also be designated by the same reference but without a final letter.

Figure 1:
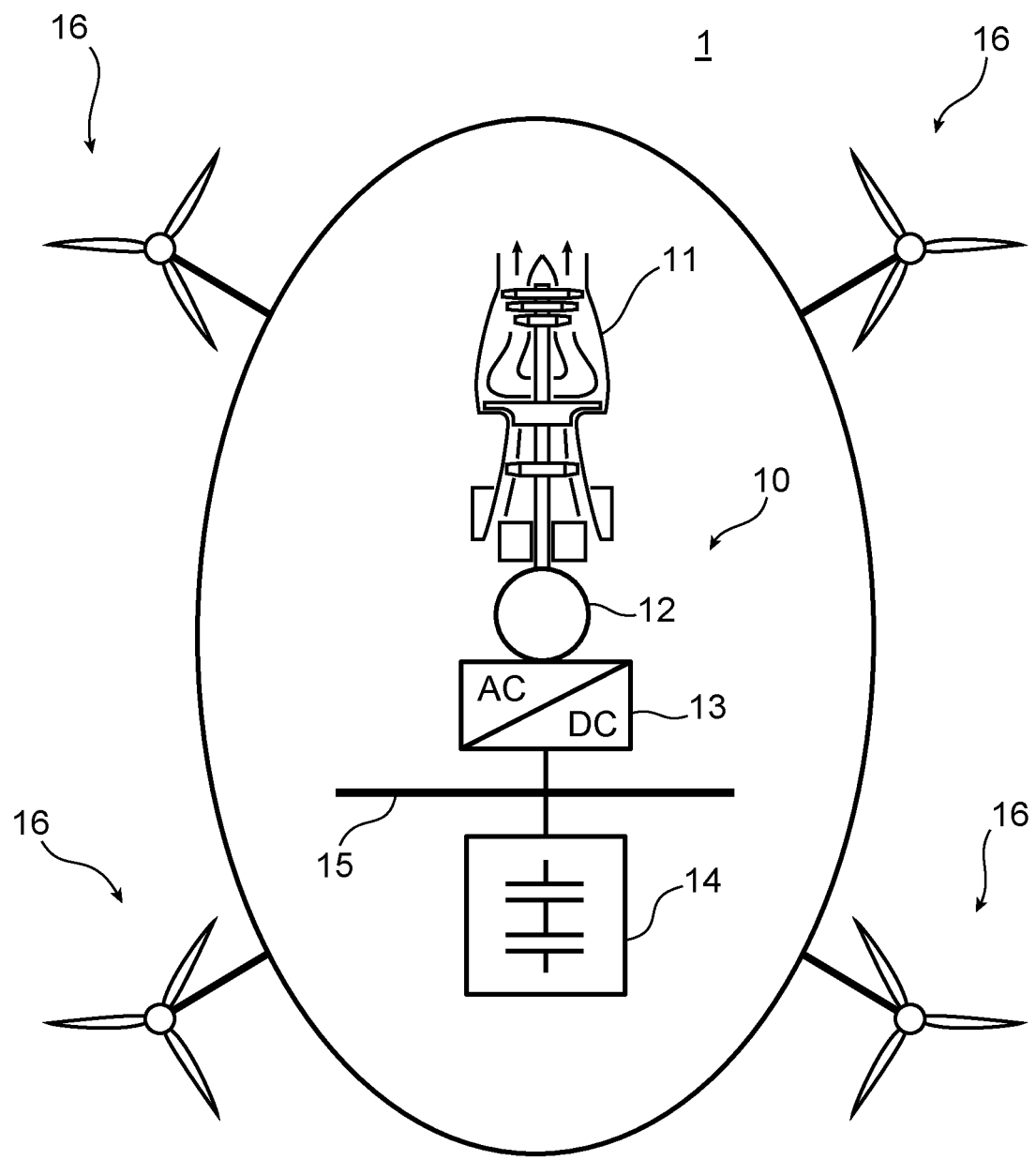
FIG. 1 diagrammatically represents an example of a rotary wing aircraft equipped with a first example of a propulsion system according to the invention.

FIG. 1 diagrammatically represents an example of a rotary wing aircraft equipped with a first example of a propulsion system according to the invention. The aircraft 1 represented herein is a four-rotor aircraft, sometimes also called a "quadricopter". It has an on-board propulsion system 10 comprising a gas turbine 11, an electricity generator 12, a rectifier 13, an electrochemical battery 14, an electrical power supply bus 15, an annular electricity network not represented, and four motor units 16. The electricity generator 12 is driven in rotation by a rotor of the gas turbine 11 and it outputs an alternating current to the rectifier 13. The rectifier 13 injects rectified voltage onto the electrical power supply bus 15 to distribute electrical power to the motor units 16. The battery 14 is also connected to the electrical power supply bus 15. It is arranged to recharge when the electricity generator 12 outputs power exceeding the power consumed by the motor units 16. The battery 14 is also arranged to output electrical power when the electricity generator 12 outputs insufficient power for the motor units 16 or when the electricity generator 12 is stopped. Each motor unit 16 comprises at least one electric motor (not represented) and a propeller 161 driven by the associated electric motor. An annular electrical network described in the example embodiments with reference to FIGS. 2 and 4, connects the electrical power supply bus 15 to each of the motor units 16. The propulsion system can be qualified as hybrid due to the simultaneous presence of mechanical energy and electrical energy in the propulsion system power transmission chain. In particular, it can be called a "series hybrid architecture".

Figure 2:
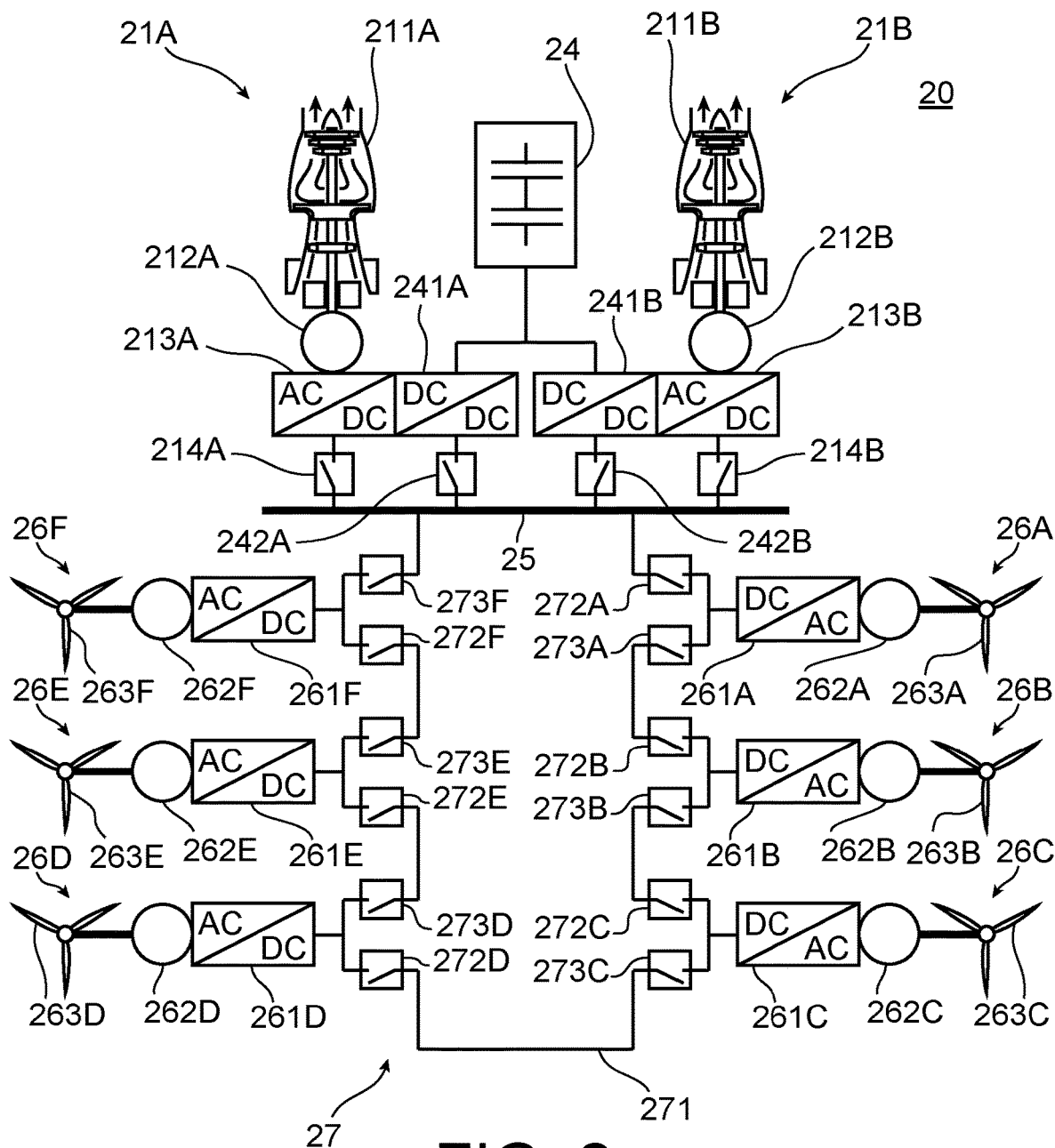
FIG. 2 represents a second example of the propulsion system according to the invention.

FIG. 2 represents a second example of the propulsion system according to the invention, and particularly its annular electrical network, in more detail. The propulsion system 20 comprises two electricity generating sets 21A, 21B, an electrical energy storage unit 24, an electrical power supply bus 25, six motor units 26A, 26B, 26C, 26D, 26E, 26F and an annular electrical network 27.

Each electricity generating set 21 comprises a gas turbine 211A, 211B, an electricity generator 212A, 212B, a rectifier 213A, 213B and a controlled switch 214A, 214B. Each electricity generator 212 is mechanically coupled to a gas turbine 211 and outputs an alternating voltage to the corresponding rectifier 213. Each rectifier 213 converts the alternating voltage to a direct voltage adapted to the electrical power supply bus 25. Each controlled switch 214 can be used to connect an electricity generating set 21 to the electrical power supply bus 25 in the closed state, and isolates these elements in the open state. The two electricity generating sets 21A, 21B can function simultaneously or alternately, particularly depending on electrical power supply needs. It should be noted that the electricity generating sets 21 can be of different types. In particular, they do not necessarily include a gas turbine; they may also include any other type of internal combustion engine or a fuel cell. Secondly, the electricity generating sets may also be arranged to output an alternating voltage on the electrical power supply bus 25. Furthermore, the number of electricity generating sets can be adapted. A single set may be sufficient, but a number equal to or more than three can also be envisaged.

The electrical energy storage unit 24 may for example comprise an electrochemical battery or supercapacitors. It may also comprise an energy management unit arranged to manage charging and discharging. The storage unit 24 is associated with two choppers 241A, 241B and two controlled switches 242A, 242B installed in a parallel configuration. The choppers 241 can adapt voltage levels between the electrical storage unit 24 and the electrical power supply bus 25. Preferably, the controlled switches 242A, 242B are controlled to be inverted, so as to prevent simultaneous use of the two choppers 241A, 241B. The presence of a pair of choppers and switches provides redundancy for management of chopper failures.

The electrical power supply bus 25 is arranged to connect each of the electricity generating sets 21, the electrical energy storage unit 24 and the annular electrical network 27 in parallel. In the case of transmission of direct current (DC) electrical power, it comprises at least two electrical conductors. In the case of transmission of alternating current (AC) electrical power, it comprises at least one electrical conductor per phase. In some embodiments, the bus 25 can consist simply of electrical terminals.

Each motor unit 26 comprises an inverter 261A, 261B, 261C, 261D, 261E, 261F, an electric motor 262A, 262B, 262C, 262D, 262E, 262F and a propeller 263A, 263B, 263C, 263D, 263E, 263F. Each inverter 261 receives a direct electric current from the annular electrical network 27 and converts it to an alternating electric current adapted to the power demand from the electric motor 262. Each propeller 263 is mechanically coupled to the rotor of the associated electric motor 262. The inverters 261 can be integrated into the electric motors 262. In other words, they can be integrated into the electric motors box. The electric motors are then commonly called "smart motors". In the example embodiment in FIG. 2, the propulsion system 20 comprises six motor units 26A-26F. Nevertheless, there could be a different number. The propulsion system according to the invention comprises at least four motor units, to maintain sufficient propulsion capacity in the case of a failure of one motor unit. In practice, it can advantageously comprise at least eight.

In another embodiment, not represented, the electric motor of each motor unit is associated with a pair of counter-rotating propellers. A first propeller is mechanically coupled to the rotor of the electric motor so as to rotate in the same direction as the rotor and a second propeller is mechanically coupled to the rotor of the electric motor so as to rotate in the opposite direction. In particular, the first propeller may be directly coupled to the rotor of the electric motor. The second propeller is typically coupled to the rotor of the electric motor through a gear. Advantageously, the motor units are arranged such that the propellers in each pair rotate at equal rotation speeds.

In yet another embodiment, not represented, each motor unit comprises an inverter, two electric motors and two propellers. A first propeller is mechanically coupled to the rotor of a first electric motor and a second propeller is mechanically coupled to the rotor of a second electric motor. The inverter in each motor unit powers the two electric motors in parallel. The mass of the motor units is then advantageously reduced. The motor units are arranged such that the first and second propellers in each pair rotate in opposite directions, preferably at equal rotation speeds.

In yet another different embodiment, not represented, each motor unit comprises an inverter, a double rotor electric motor and two propellers. Each electric motor comprises a single stator and two counter-rotating rotors. A first propeller is mechanically coupled to a first rotor of the electric motor and a second propeller is mechanically coupled to a second rotor of the electric motor. The inverter in each motor unit powers the two rotors in parallel, leading to a weight saving.

Each motor unit is arranged such that the first and second propellers rotate in opposite directions, preferably at equal rotation speeds.

In the different embodiments of the motor units, the electric motors may be "smart motors", in other words the motors integrate the control circuit and particularly the inverters, inside their housing. The electric motors and the control circuit can thus be cooled by common means. The electric motors may for example be air-cooled by natural convection or by forced convection, for example via a fan coupled to the rotor or by propeller blades. Preferably, the propellers are directly coupled mechanically to the rotors of the electric motors. This coupling, called a "direct drive", avoids the use of gears that generally require a lubrication circuit. The electric motors can in particular be axial flux machines. The result is easier integration of the rotors very close to the propellers. Any type of electric motor can be used. Nevertheless, the electric motors are preferably capable of being de-excited, either mechanically by a declutchable coupling, or electrically by a reduction of the inducting flux, in case of an internal fault in the electric motors.

Moreover, each inverter may comprise one or several emergency arms that can be used to replace a defective arm, in addition to the arm(s) necessary to power one or more electric motors. The function to adapt the electric current may thus be maintained in each motor unit despite the presence of a failure of an arm of the inverter. Preferably, each arm is protected by a heat-fuse type element to very quickly isolate an arm with a fault from the other arms.

The annular electrical network 27 is arranged to connect each motor unit 26 to the electrical power supply bus 25 in a ring configuration. The annular electrical network 27 comprises an electrical line 271 and for each motor unit 26, a pair of controlled switches 272A and 273A, 272B and 273B, 272C and 273C, 272D and 273D, 272E and 273E, 272F and 273F. The electrical line 271 is connected to the bus 25 at each of its ends. It is interrupted at each motor unit 26 to enable a reconfigurable connection with these motor units 26. Each interruption forms a first connection point at one of the ends of the electrical line 271 and a second connection point at the other end of the electrical line 271. Each switch 272 is connected between the first connection point and an input to the inverter 261 of the corresponding motor unit 26. Each switch 273 is connected between the second connection point and the input to this same inverter 261. Thus in this ring configuration, the electrical line 271 successively connects the motor units 26 to each other forming a loop closing on the bus 25. The propulsion unit 20 also comprises a control unit of the annular electric network 27, not represented, arranged to control opening and closing of the switches 272, 273. In particular, the control can be made as a function of the detection of electrical faults in the motor units 26 and/or the electrical line 271. If there are no electrical faults, all the switches 272, 273 can be controlled to be in the conducting state.

Figure 3:
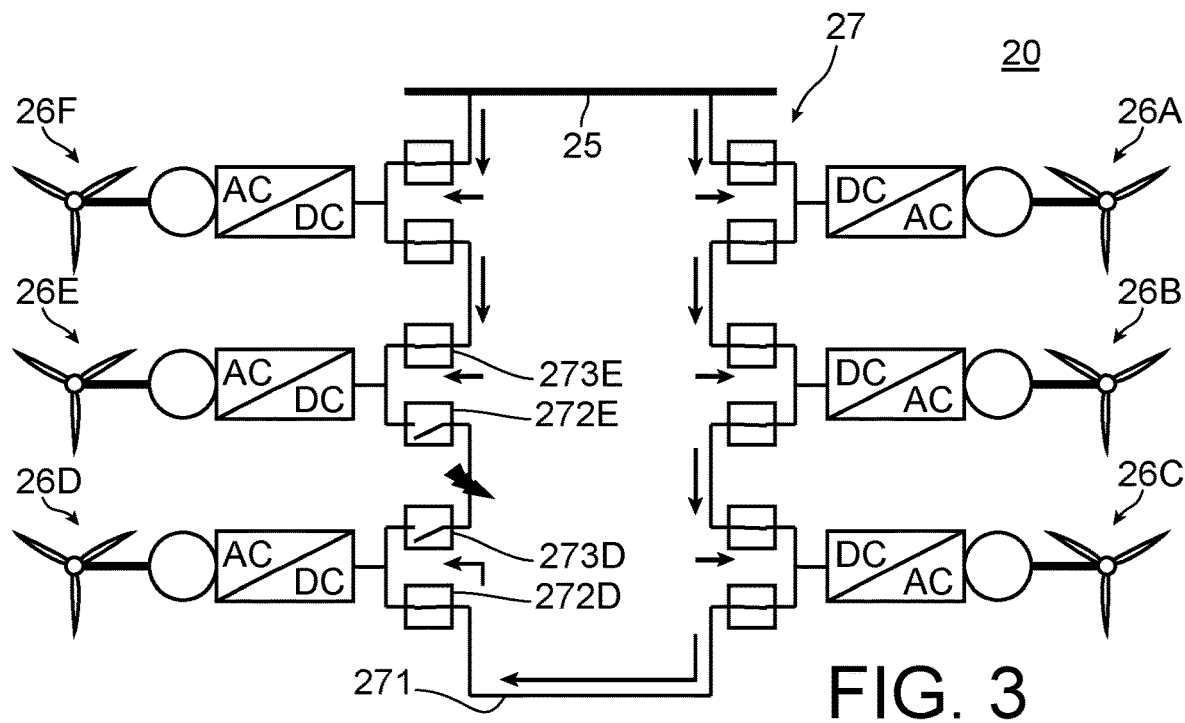
FIG. 3 illustrates a reconfiguration of the electrical network for the example of the propulsion system according to FIG. 2.

FIG. 3 illustrates the reconfiguration of the annular electrical network 27 described with reference to FIG. 2 in the case of an electrical fault detected on a portion of the electrical line 271 between the motor units 26D and 26E. Said portion is isolated by opening the switch 273D connected to the motor unit 26D and the switch 272E connected to the motor unit 26E. It should be noted that the two motor units 26D and 26E remain powered, the first through the first end of the electrical line 271 and the second through its second end. The electrical fault thus has no incidence on operation of the motor units 26. Furthermore, in the case of an electrical fault in the motor unit 26, for example in the case of a fault in an inverter 261 or an electric motor 262, the entire motor unit concerned can be isolated from the electrical network by opening the two associated switches 272, 273. All other motor units 26 remain powered, some through the first end of the electrical line 271 and the others through the second end of the electrical line.

Figure 4:
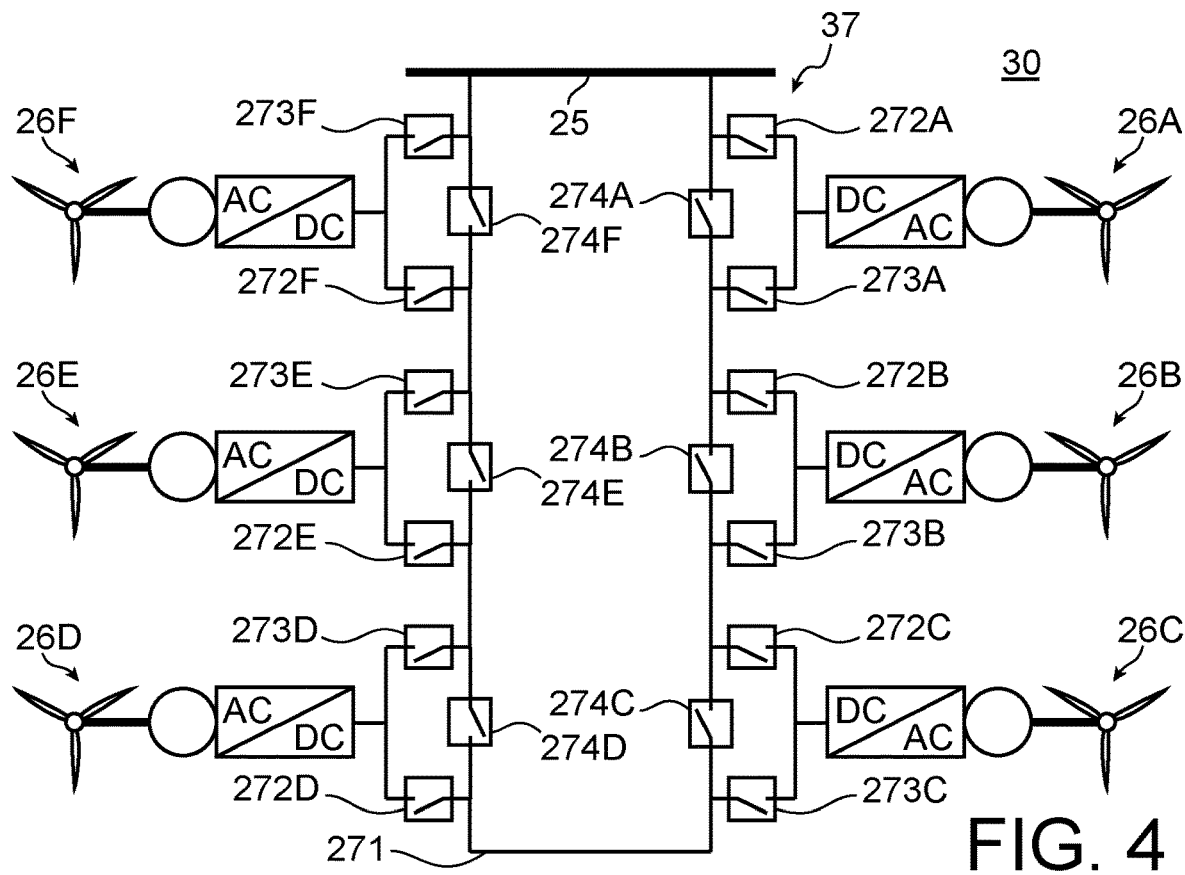
FIG. 4 represents a third example of the propulsion system according to the invention.

FIG. 4 represents a third example of the propulsion system according to the invention. The only difference between this propulsion system 30 and the propulsion system 20 in FIG. 2 in that the annular electrical network 37 also comprises a third switch 274A, 274B, 274C, 274D, 274E, 274F, for each motor unit 26. Each switch 274 is connected between the first and the second connection point of the electrical line 271. Thus, each switch 274 can restore continuity of the electrical line 271 at an interruption. The control unit of the annular electrical network 37 can also control opening and closing of the switches 274. If there are no electrical faults, all the switches 274 are normally controlled to be in the open state.

Figure 5:
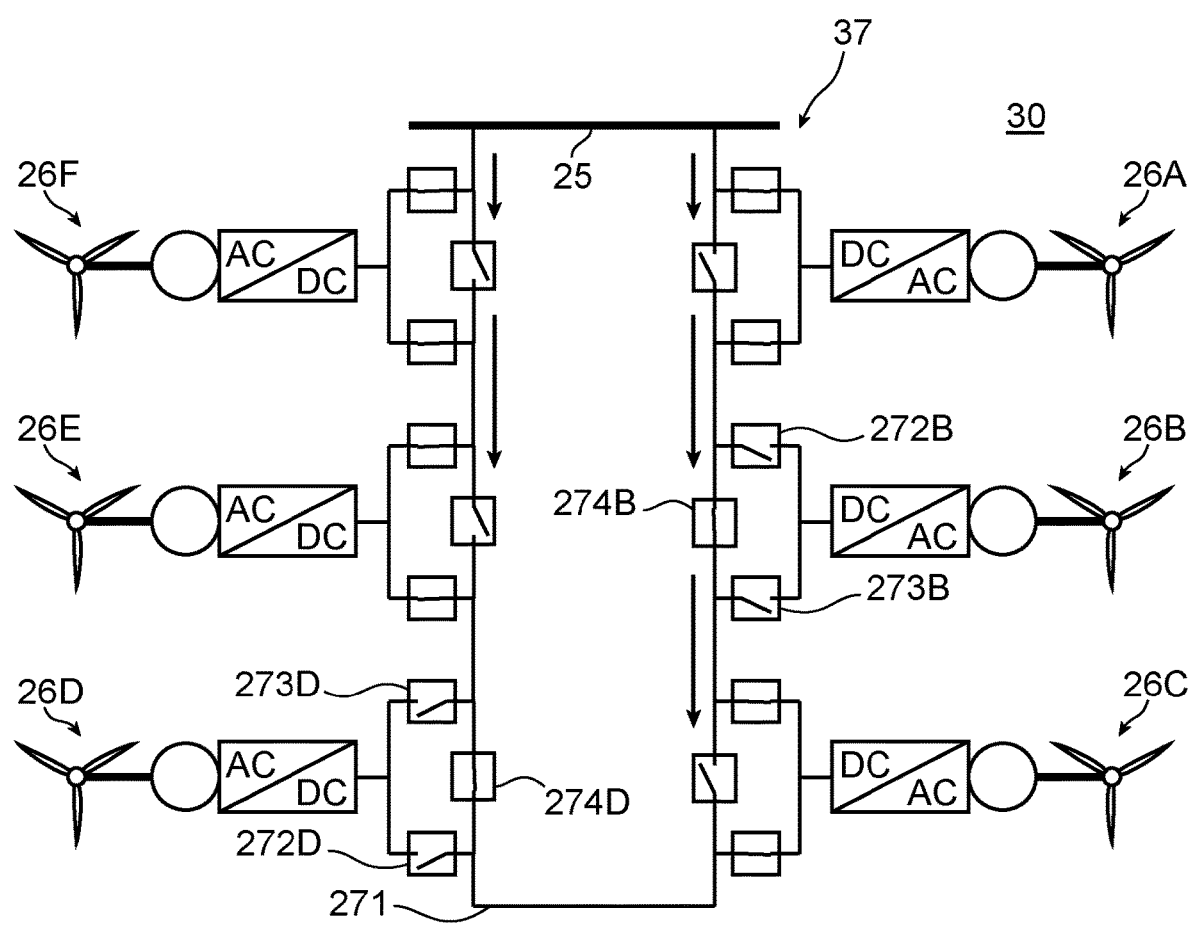
FIG. 5 illustrates a reconfiguration of the electrical network for the example of the propulsion system according to FIG. 4.

FIG. 5 illustrates the reconfiguration of the annular electrical network 37 described with reference to FIG. 4 in the case of an electrical fault detected on motor unit 26B and also on motor unit 26D. These two motor units 26B and 26D are isolated from the annular electrical network 37 by opening the switches 272B, 273B, 272D and 273D. Electrical continuity of the ring is restored by closing switches 274B and 274D. Thus, all other motor units 26 remain powered, including motor unit 26C located between the motor units 26B and 26D in fault.

What is claimed is:

1. A propulsion system for multi-rotor rotary wing aircraft, comprising:
    an electrical power source capable of outputting a power supply current,
    an electrical power supply bus connected to the electrical power supply source,
    at least four motor units, each motor unit comprising a control circuit, an electric motor connected to the control circuit and a propeller mechanically connected to a rotor of the electric motor, the control circuit being capable of supplying power to the electric motor from the power supply current output by the electrical power supply source, and
    an annular electrical network capable of connecting each motor unit control circuit to the electrical power supply bus, the annular electrical network comprising:
        an electrical line, having a first end and a second end connected to the electrical power supply bus, the electrical line being interrupted at each motor unit and comprising a first connection point at the first end and a second connection point at the second end, and
        for each motor unit, a first switch and a second switch, the first switch connecting the motor unit control circuit to the first connection point of the electrical line, the second switch connecting said control circuit to the second connection point of the electrical line.

2. The propulsion system of claim 1, wherein the annular electrical network also comprises a third switch for each motor unit, connecting the first connection point to the second connection point of the electrical line.

3. The propulsion system of claim 1, also comprising a control unit of the annular electrical network, the control unit being arranged to control opening and closing of the switches of the annular electrical network as a function of the detection of electrical faults at motor units and/or the electrical line.

4. The propulsion system claim 1, wherein the electrical power supply source comprises one or several electricity generating sets, each set comprising an internal combustion engine and an electricity generator, the electricity generator being mechanically coupled to a rotor of the internal combustion engine and being connected to the electrical power supply bus.

5. The propulsion system of claim 4, wherein the electrical power supply source comprises a switch and/or a circuit breaker between each electricity generator and the electrical power supply bus.

6. The propulsion system of claim 1, wherein the electrical power supply source comprises an electrical energy storage unit connected to the electrical power supply bus.

7. The propulsion system of claim 6, wherein the electrical power supply source comprises a switch and/or a circuit breaker between the electrical energy storage unit and the electrical power supply bus.

8. The propulsion system of claim 1, wherein the control circuit of each motor unit comprises a converter.

9. A multi-rotor rotary wing aircraft comprising a propulsion system according to claim 1.

* * * * *